（12）United States Patent
Lockett et al.

(10) Patent No.: US 9,993,875 B2
(45) Date of Patent: Jun. 12, 2018

(54) METHODS FOR FABRICATION OF NANOSTRUCTURES

(71) Applicant: NthDegree Technologies Worldwide Inc., Tempe, AZ (US)

(72) Inventors: Vera N. Lockett, Phoenix, AZ (US); Mark D. Lowenthal, Gilbert, AZ (US); William J. Ray, Fountain Hills, AZ (US); John Gustafson, Tempe, AZ (US)

(73) Assignee: NTHDEGREE TECHNOLOGIES WORLDWIDE, INC., Tempe, AZ (US)

( * ) Notice: Subject to any disclaimer, the term of this patent is extended or adjusted under 35 U.S.C. 154(b) by 413 days.

(21) Appl. No.: 14/589,310

(22) Filed: Jan. 5, 2015

(65) Prior Publication Data

US 2015/0107413 A1    Apr. 23, 2015

Related U.S. Application Data (62) Division of application No. 13/928,143, filed on Jun. 26, 2013, now abandoned.

(60) Provisional application No. 61/665,796, filed on Jun. 28, 2012.

(51) Int. Cl.
*H01B 1/02* (2006.01)
*B22F 9/24* (2006.01)
*H01B 13/00* (2006.01)
*C09D 11/52* (2014.01)

(52) U.S. Cl.
CPC ............... *B22F 9/24* (2013.01); *C09D 11/52* (2013.01); *H01B 1/02* (2013.01); *H01B 1/026* (2013.01); *H01B 13/00* (2013.01)

(58) Field of Classification Search
CPC ....................................................... H01B 1/02
See application file for complete search history.

(56) References Cited

U.S. PATENT DOCUMENTS 1,278,744 A * 9/1918 Poetschke ............... B01J 47/10
                                                    134/25.5
3,202,488 A * 8/1965 Avery ..................... B22F 1/025
                                                    252/514
3,802,868 A * 4/1974 Cech .................... C22B 15/0021
                                                    75/642
7,598,482 B1  10/2009 Verhulst et al.
(Continued)

FOREIGN PATENT DOCUMENTS

WO    WO 2011/071885    6/2011

OTHER PUBLICATIONS

Sun et al, J. Am. Chem. Soc., 2004, 126, 3892-3901.*
(Continued)

*Primary Examiner* — William Young
(74) *Attorney, Agent, or Firm* — Knobbe, Martens, Olson & Bear, LLP (57) ABSTRACT

Systems and methods for fabricating nanostructures using other nanostructures as templates. A method includes mixing a dispersion and a reagent solution. The dispersion includes nanostructures such as nanowires including a first element such as copper. The reagent solution includes a second element such as silver. The second element at least partially replaces the first element in the nanostructures. The nanostructures are optionally washed, filtered, and/or deoxidized.

22 Claims, 5 Drawing Sheets

(56) References Cited

U.S. PATENT DOCUMENTS

| | | | |
|---|---|---|---|
| 7,893,476 B2 | 2/2011 | Verhulst | |
| 7,897,494 B2 | 3/2011 | Vereecken | |
| 7,947,162 B2 | 5/2011 | Hautier et al. | |
| 8,029,851 B2 | 10/2011 | Lee | |
| 2006/0090601 A1* | 5/2006 | Goia | B22F 1/0007 |
| | | | 75/374 |
| 2006/0141268 A1 | 6/2006 | Kalkan et al. | |
| 2008/0246020 A1 | 10/2008 | Kawashima et al. | |
| 2009/0311530 A1 | 12/2009 | Hirai et al. | |
| 2009/0321364 A1 | 12/2009 | Spaid et al. | |
| 2012/0107598 A1 | 5/2012 | Zou et al. | |
| 2012/0125156 A1 | 5/2012 | Xia et al. | |
| 2012/0138913 A1 | 6/2012 | Alsayed et al. | |
| 2012/0164470 A1* | 6/2012 | Leschkies | B82Y 40/00 |
| | | | 428/607 |
| 2012/0183768 A1* | 7/2012 | Kondo | H01B 1/22 |
| | | | 428/336 |
| 2013/0008690 A1* | 1/2013 | Wiley | H01B 1/026 |
| | | | 174/120 C |
| 2014/0001421 A1 | 1/2014 | Lockett et al. | |

OTHER PUBLICATIONS

International Search Report and Written Opinion for application No. PCT/US2013/047965, dated Sep. 25, 2013.
"Copper Nanowires Enable Bendable Displays and Solar Cells; Pin-Like Copper Structures Self-Assemble in Solution", Science Daily, www.sciencedaily.com/releases/2010/06/100601114722.htm, Jun. 1, 2010.
"Copper-Nickel Nanowires Could Be Perfect Fit for Printable Electronics", Science Daily, www.sciencedaily.com/releases/2012/05/120529182713.htm, May 29, 2012.
"Highly Electronic Conductive Silver Nanowires", RAS Materials, www.rasmaterials.com/products/silver-nanowires.html, visited on Jun. 6, 2012.
"Markets for Nanowire Solutions", Nanoforge Conductive Nanowire Solutions, http://nanoforge.com/markets.html, visited on Jun. 6, 2012.
"NanoForge Nanowire Technology", Nanoforge Conductive Nanowire Solutions, http://nanoforge.com/technology.html, visited on Jun. 6, 2012.
"Copper Nanowires in Aqueous Solution", Nanoforge Conductive Nanowire Solutions, http://nanoforge.com/products.html, visited on Jun. 6, 2012.
"Silver Nanowires", Blue Nano Inc., http://www.bluenanoinc.com/nanomaterials/silver-nanowires-information.html, visited on Jun. 6, 2012.
"SLV-NW-90 Silver Nanowires", Blue Nano Inc., Silver Nano Technical Data Sheet, Rev. Jul. 14, 2011, www.bluenanoinc.com; pp. 1-13.
"Silver Nanowires & Nanoparticles, SLV-NW-60/90/300/900, SLV-NP-100", Blue Nano Inc., www.bluenanoinc.com, Blue Nano Inc., Silver Nano Technical Data Sheet, Rev. Feb. 22, 2010, pp. 1-9.
"Ultra-Long Silver NanoWires", Nanotrons Corporation, www.nanotrons.com, Product Brief, published Feb. 2, 2012, visited on Jun. 6, 2012.
"Silver Nanowires", Seashell Technology, LLC, www.seashelltech.com, visited on Jun. 6, 2012.
Caswell et al., "Seedless, Surfactantless Wet Chemical Synthesis of Silver Nanowires", Nano Letters, vol. 3, No. 5, pp. 667-669 (2003).
Ditlbacher et al., "Silver Nanowires as Surface Plasmon Resonators", The American Physical Society, Physical Review Letters, vol. 95, Issue 25, pp. 257403-1-257404, Dec. 16, 2005.
Gao et al., "Electrochemical Synthesis of Copper Nanowires", Journal of Physics: Condensed matter, vol. 14, No. 3, pp. 355-363, Jan. 28, 2002.
Gelves et al., "Multigram Synthesis of Copper Nanowires using ac Electrodeposition into Porous Aluminium Oxide Templates", Journal of Materials Chemistry, vol. 16, pp. 3075-3083, May 31, 2006.
Habib, "Optimization of Conditions for the Synthesis of Silver Nanowire", Welch Summer Scholar Program, pp. UTDI-1-UTDI-20 (2006).
Hansen et al., "Direct Oxidation Growth of CuO Nanowires from Copper-Containing Substrates", Hindawi Publishing Corporation, Journal of Nanomaterials, vol. 2008, Article No. 48, Article ID 830474 in 7 pages, Jan. 2008.
Kevin et al., "Formation of Hybrid Structures: Copper Oxide Nanocrystals Templated on Ultralong Copper Nanowires for Open Network Sensing at Room Temperature", Nanotechnology, vol. 22, No. 23, Article 235701 in 10 pages, Apr. 7, 2011.
Korte, "Rapid Synthesis of Silver Nanowires", National Nanotechnology Infrastructure Network (NNIN), 2007 NNIN Research Experience for Undergraduates (REU) Research Accomplishments, pp. 28-29 (2007).
Luo et al., "Silver-Coated Copper Nanowires with Improved Anti-Oxidation Property as Conductive Fillers in Low-Density Polyethylene", The Canadian Journal of Chemical Engineering, vol. 91, Issue 4, pp. 630-637, Apr. 2013.
Patel, "Application Note: Synthesis of Silver Nanowires", Sigma-Aldrich Co. LLC, Material Matters vol. 4, Article 1, http://www.sigmaaldrich.com/technical-documents/articles/material-matters/application-note0.html, visited on Nov. 29, 2011.
Rathmell et al., "The Synthesis and Coating of Long, Thin Copper Nanowires to Make Flexible, Transparent Conducting Films on Plastic Substrates", Advanced Materials, vol. 23, Issue 41, pp. 4798-4803, Sep. 23, 2011.
Tang et al., "Syntheses of Silver Nanowires in Liquid Phase", Nanowires Science and Technology, Nanowires Science and Technology, ISBN 978-953-7619-89-3, pp. 25-42, Feb. 2010.
Zhang et al., "Wet Chemical Synthesis of Silver Nanowire Thin Films at Ambient Temperature", American Chemical Society, Chemistry of Materials, vol. 16, pp. 872-876, Feb. 6, 2004.
Wiley, "Solution-Coatable Transparent Conductive Films of Copper Nanowires," presentation at 2012FLEX Flexible Electronics & Displays Conference & Exhibition, Feb. 6-9, 2012.
International Preliminary Report on Patentability issued in PCT Application No. PCT/US2013/047965 dated Dec. 31, 2014, 6 pages.
Bi et al., Supporting Information for "Highly Ordered Rectangular Silver Nanowire Monolayers: Water-Assisted Synthesis and Galvanic Replacement Reaction with $HAuCl_4$", The Royal Society of Chemistry, Chemical Communications, vol. 46, pp. 598-600, Nov. 18, 2009.

* cited by examiner

METHODS FOR FABRICATION OF NANOSTRUCTURES

CROSS-REFERENCE TO RELATED APPLICATIONS

This application is a divisional of U.S. application Ser. No. 13/928,143, filed Jun. 26, 2013, entitled "Systems and Methods for Fabrication of Nanostructres," which claims the benefit of U.S. Provisional Application No. 61/665,796, filed Jun. 28, 2012, entitled "Systems and Methods for Fabrication of Nanostructres," the entire contents of which are incorporated by reference herein and made a part of this specification. U.S. patent application Ser. No. 13/360,999, filed Jan. 30, 2012, published as U.S. Pub. No. 2012/0217453, entitled "Metallic Nanofiber Ink, Substantially Transparent Conductor, and Fabrication Method," (the '999 application) is hereby incorporated by reference in its entirety.

BACKGROUND

Field

The present application relates to fabrication of nanostructures such as silver nanowires.

Description of the Related Art

Materials reduced to the nanoscale exhibit different physical and chemical properties compared to those on macroscale. The different properties are due in part to the increase in surface area to volume ratio, which alter mechanical, electrical, optical, and catalytic properties of materials. Such distinctive properties present in nanosized materials can depend on both the size and shape of the materials.

Nanowires have attracted considerable attention due to the interesting fundamental properties which can be utilized in nanotechnology-enabled electronic, display, solar, filtration, anti-microbial, adhesive, and other commercial applications. Among many other potential applications, layers formed from dispersions of nanowirescan potentially replace a widely used transparent conductor, indium tin oxide (ITO). While ITO has a high light transmittance and electrical conductivity (e.g., depending on thickness, composition, etc., 90% over the visible spectrum between 400 nm and 700 nm and resistivity of 120 Ω/sq), ITO is brittle, slow and difficult to deposit, expensive, and its deposition entails handling of toxic precursor materials.

SUMMARY

Copper (Cu) nanowires (CuNW) are commercially available, but their electrical conductivity (Cu resistivity $\rho=1.7\times10^{-6}$ Ωcm, or $9.25\times10^3$ Ωm in a 2.0 vol % CuNW/low density polyethylene (LDPE)) and light transmittance (65% at a resistance of 15 Ω/sq) properties in dispersions, meshes, inks, and/or films are not as good as for silver (Ag) nanowires (AgNW) (Ag resistivity $\rho=1.6\times10^{-6}$ Ωcm, or less than $6.88\times10^2$ Ωm in a 2.0 vol % AgNW/LDPE, and 85% at a resistance of 15 Ω/sq, respectively). Some AgNW meshes can have a transmittance of about 92-93% at 15 Ω/sq in a binder, resin, or polymer. While AgNW are also commercially available, and have a higher conductivity and light transmittance in films, fabrication methods for AgNW are inefficient and expensive. Coating the surface of CuNW with Ag is possible, but many of the same problems of CuNW as described herein can persist with Ag-coated CuNW.

Systems and methods disclosed herein can fabricate AgNW using CuNW as templates. One advantage of certain embodiments disclosed herein is that using CuNW as templates can aid in the fabrication of relatively long AgNW as compared to previous AgNW fabrication methods. For example, AgNW are generally less than about 10 µm long, and are typically about 4 microns (µm) to about 5 µm long. By contrast, CuNW may be much longer, and use of long CuNW as a template for AgNW can form long AgNW, for example having a length greater than about 10 µm, between about 70 µm and about 150 µm, and other lengths. Longer AgNW can allow for higher conductivity (lower resistivity) due to more cross points in the percolative network. This higher conductivity may be achieved while having less mass per square area, which can result in better light transmittance. In CuNW and AgNW films, inks, and other applications, conductivity and transmittance have an inverse relationship—conductivity decreases as transmittance increases. Certain fabrication processes disclosed herein can advantageously control the size of the AgNW by using CuNW as templates, reducing Ag waste, and thereby reducing costs. The reduced costs can allow for use of AgNW in a wide variety of applications such as, for example, solar panels, touch screens, and displays. Replacing ITO with metal nanowires can provide many of the benefits of ITO while allowing for use in more versatile applications such as, for example, conductive inks, polymers, and flexible films for displays and/or solar panels, and the like. Some uses of conductive inks and polymers are described in more detail in the '999 application. Some embodiments of metal nanowires can maintain their light transmittance and electrical conductivity properties even under mechanical deformation. In certain such applications, such as conductive ink applications, AgNW benefits can include, but are not limited to, (1) low resistance per given optical transparency, (2) high transmittance of light over a broad range of wavelengths (useful in solar panels), and (3) mechanical flexibility (application to curved surfaces or flexible devices, durability).

In addition, AgNW have a higher resistance to corrosion as compared to CuNW. Conductivity degrades with oxidation. In fabrication steps or applications with exposure to a corroding environment, CuNW can oxidize quickly and conductivity degrades. For example, printed electronics using electrically conductive fillers in polymer composites or active inks used in magazines, consumer packaging, and clothing designs are often exposed to oxidizing environments. Reducing AgNW costs may allow for AgNW to be cost-effectively used in such applications, generally without degradation of conductivity.

Systems and methods for fabricating a nanostructure using another nanostructure as a template are disclosed herein. A method includes mixing a dispersion and a reagent solution. The dispersion includes nanostructures including a first element, such as copper. The reagent solution includes a second element, such as silver. The second element at least partially replaces the first element in the nanostructures. The nanostructures are optionally washed, filtered, and/or deoxidized. In certain embodiments, the fabrication includes providing CuNW that are washed, filtered, and/or deoxidized, and dispersed in a dispersion. Silver in a solution may be added to the CuNW dispersion, or vice versa. In a chemical replacement reaction, the Ag in the mixture and the Ag takes the place of the Cu in the nanowire to form a AgNW. Thus, the CuNW may act as a template for the AgNW.

In some embodiments, a method comprises mixing a dispersion and a reagent solution. The dispersion includes nanostructures comprising a first element. The reagent solution includes a second element. The second element at least partially replaces the first element in the nanostructures.

The nanostructures may include nanowires. The first element may be copper. The second element may be silver. The concentration of the nanostructures in the dispersion before mixing may be between about 0.1 g/L and about 1 g/L. The dispersion may include dispersants and surfactants. The dispersion may include organic solvents. The dispersion may include polyvinylpyrrolidone, bile salts, water, ethanol, combinations thereof, and/or the like.

The reagent solution concentration before mixing may be between about 0.1 mol/L (molar, M) and about 0.15 M. The reagent solution may include silver nitrate silver ions, combinations thereof, and/or the like. The reagent solution may be slowly added to the dispersion, such as adding the reagent solution drop-wise to the dispersion. The mixing of the reagent solution with the dispersion may include vigorously stirring with a stirrer, such as a magnetic stirrer.

The second element may partially or fully replace the first element in the nanostructure. The second element may replace at least about 5%, about 25%, about 50%, about 75%, about 90%, about 95%, about 100% of the first element, and/or combinations thereof. After mixing, the nanostructures in dispersion may have a resistivity less than about $7.5 \times 10^3$ Ωm in a 2.0 vol % nanostructures/low density polyethylene and/or may have a light transmittance greater than about 70% at a resistance of 15 Ω/sq.

The nanostructures may be filtered out before mixing. The filtering may include using a non-porous filter. The filter may have pore sizes of about 0.2 microns or less. The filter may comprise Teflon. The nanostructures may be dispersed during any of the steps of the fabrication process. Dispersing the nanostructures may include dispersing in a solvent. The solvent may comprise water. The solvent may comprise an organic solvent. The organic solvent may comprise ethanol. The solvent may include at least one of dispersants and surfactants. The solvent may include polyvinylpyrrolidone, bile salts, combinations thereof, and/or the like. The nanostructures may be deoxidized. Deoxidizing may include mixing an acid and a first dispersion including oxidized nanostructures. The acid may comprise 0.05 M HCl. The filter may be stable in acids in low concentrations. The deoxidized nanostructures may be dispersed in a solvent. The solvent may comprise water. The solvent may comprise an organic solvent. The organic solvent may comprise ethanol. The solvent may include at least one of dispersants and surfactants. The solvent may include polyvinylpyrrolidone, bile salts, combinations thereof, and/or the like. The nanostructures, after mixing, may be added to an ink. The ink may be printed to form a transparent conductive portion of a device. The device may be a solar device, display device, and/or the like.

In some embodiments, a method comprises filtering a dispersion including nano structures.

The nanostructures may include nanowires. The nanostructures comprise copper. The concentration of the nanostructures in the dispersion may be between about 0.1 g/L and about 1 g/L. The dispersion may include dispersants and surfactants. The dispersion may include organic solvents. The dispersion may include polyvinylpyrrolidone, bile salts, water, ethanol, combinations thereof, and/or the like. The filtering may include using a non-porous filter. The filter may have pore sizes of about 0.2 microns or less. The filter may comprise Teflon. The nanostructures may be dispersed in a solvent. The solvent may comprise water. The solvent may comprise an organic solvent. The organic solvent may comprise ethanol. The solvent may include at least one of dispersants and surfactants. The solvent may include polyvinylpyrrolidone, bile salts, combinations thereof, and/or the like. The nanostructures may be deoxidized. Deoxidizing may include mixing an acid and a first dispersion including oxidized nanostructures. The acid may comprise 0.05 M HCl. The mixed acid and first dispersion may be filtered through a filter. The filter may be non-fibrous. The filter may have pore sizes of about 0.2 microns or less. The filter may comprise Teflon. The filter may be stable in acids in low concentrations. The deoxidized nanostructures may be dispersed in a solvent. The solvent may comprise water. The solvent may comprise an organic solvent. The organic solvent may comprise ethanol. The solvent may include at least one of dispersants and surfactants. The solvent may include polyvinylpyrrolidone, bile salts, combinations thereof, and/or the like.

In some embodiments, a dispersion comprises a solvent and nanowires comprising silver. The nanowires have a length greater than about 10 microns in a dimension. The nanowires are dispersed in the solvent.

The nanowires can have a length greater than about 25 microns, greater than about 50 microns, greater than about 70 microns, or greater than about 150 microns in a dimension. The nanowires can have a length between about 10 microns and about 150 microns, between about 25 microns and about 150 microns, between about 50 microns and about 150 microns, or between about 70 microns and about 150 microns in the dimension. The nanowires may comprise at least about 5%, at least about 10%, at least about 25%, at least about 50%, at least about 75%, at least about 90%, or at least about 95% silver. The nanowires may comprise less than about 5%, less than about 10%, less than about 25%, less than about 50%, less than about 75%, less than about 90%, or less than about 95% copper. The nanowires may comprise about 100% silver. The nanowires may comprise substantially no copper. The nanowires in films may have a resistivity less than about $7.5 \times 10^3$ Ωm in a 2.0 vol % nanowires/low density polyethylene. The nanowires in dispersion may have a visible light transmittance greater than about 70% at a resistance of 15 Ω/sq. A concentration of the nanowires may be between about 0.1 g/L and about 1 g/L. The solvent may comprise water. The solvent may comprise organic solvent. The organic solvent may comprise ethanol. The solvent may comprise at least one of dispersants and surfactants. The solvent may comprise polyvinylpyrrolidone. The solvent may comprise include bile salts. A conductive ink may comprise the dispersion. A device may comprise the conductive ink. The device may be a solar device, display device, and/or the like.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In particular, the disclosed embodiments relate to nanowires. This, however, is not intended to be limiting. It is to be understood that, whenever "nanowire(s)" is mentioned herein, this is to be read and understood as the more general terminology "elongate nanostructure" or other crystalline nanostructures. The term "elongate" generally means that the length is greater than the width (diameter if cylindrical), but it will be appreciated that within a plurality of nanostructures, some nanostructures may not be considered "elongate." A "nanostructure," including nanowires, can have a length on the order of microns and a width (diameter if cylindrical) on the order of nanometers, but may be characterized as a nanostructure or nanodevice on the basis of the order of magnitude of the smaller dimension even if, based on the order of magnitude of the larger dimension, it might alternatively be characterized as a microstructure or microdevice. The nanowires may be replaced by any other suitable elongate nanostructure, in particular any two-dimensionally confined pieces of solid material in the form of wires (nanowires), tubes (nanotubes), rods (nanorods), and similar elongated substantially cylindrical or polygonal nanostructures having a longitudinal axis, as well as other crystalline nanostructures of varying shapes, sizes, volume, and weight such as cubes, pyramids, bypyramids, spheres, and/or the like, or any regular or any irregular shaped two-dimensional or three-dimensional structure, including nanoclusters and nanoplates.

The nanowires in some embodiments can be characterized as a conductive nanowire having a diameter between about 1 nm and about 500 nm and length between about 5 nm and about 300 µm. In certain embodiments, the diameter of the nanowire is between about 20 nm and about 150 nm, and the length of the nanowire is between about 10 µm and about 150 µm. In certain embodiments, nanowires have an average length:width ratio greater than about 3:1, greater than about 6:1, greater than about 10:1, greater than about 20:1, greater than about 50:1, greater than about 140:1, greater than about 300:1, greater than about 1,000:1, greater than about 2,000:1, greater than about 5,000:1, greater than about 10,000:1, greater than about 14,000:1, greater than about 20:000:1, greater than about 30,000:1, greater than about 45,000:1, greater than about 70,000:1, greater than about 100,000:1, greater than about 125,000:1, or greater than about 150,000:1. Other average length:width ratios are also possible.

Dispersion Including Nano Structures

Figure 1:
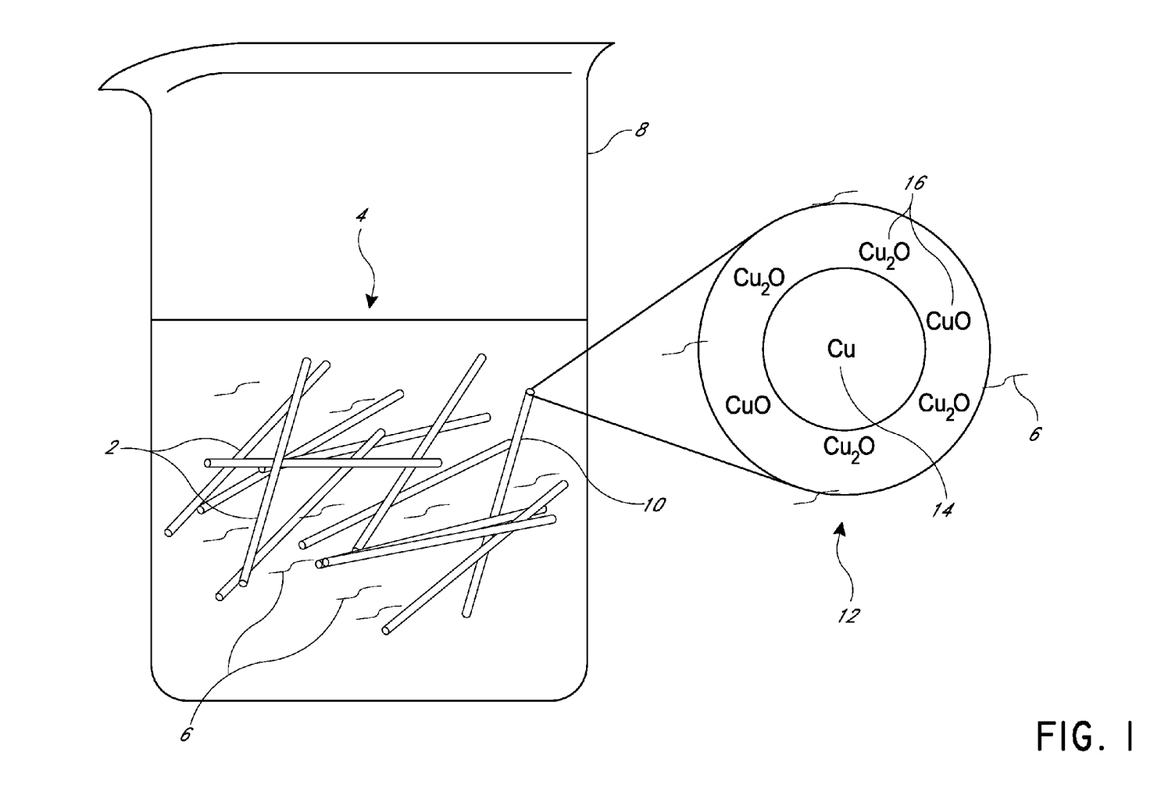
FIG. 1 illustrates an example embodiment of copper nanowires dispersed in a dispersion.

FIG. 1 illustrates an example embodiment of copper nanowires CuNW 2 dispersed in a dispersion 4. The size of the CuNW 2 are exaggerated for the purposes of illustration. The CuNW 2 are commercially available from such manufacturers as Nanoforge Corp. of 2601 Weck Dr., Durham, N.C. 27709. The dispersion 4 can include solvents and optionally includes dispersants and/or surfactants 6. The solvents can include, for example, water, ethanol, isopropanol, terpineol, ethylene glycol, dithylene glycol, combinations thereof, and/or the like. Non-polar solvents may also be possible. In some embodiments, dispersants and/or surfactants 6 comprise polyvinylpyrrolidone (PVP) and/or bile salts. Dispersants can include polymers such as, for example, polyethylene oxide, polyoxyethylene nonylphenyl ether, polypropylene oxide, polyoxyethylene glycol alkyl ethers, polyoxypropylene glycol alkyl ethers, polyethoxylated tallow amine, poloxamers, polysorbate, polymethylmetacrylic ammonium salt, polyacrylic ammonium salt, polyacrylic amine salt, polyacrylic sodium salt, gum Arabic, combinations thereof, and/or the like. Surfactants can include, for example, sodium lauryl ether sulfate, sodium myreth sulfate, ammonium lauryl sulfate, sodium dodecyl sulfate, alkyl aryl ether phosphate, alkyl ether phosphate, perfluorooctanesulfonate, perfluorobutanesulfonate, dioctyl sodium sulfosuccinate, alkyl benzene sulfonates, sodium stearate, sodium lauryl sarcosinate, perfluorononanoate, perfluorooctanoate, dimethyldioctadecylammonium chloride, dioctadecyldimethylammonium bromide, octenidine dihydrochloride, cetyl trimethylammonium bromide, cetyl trimethylammonium chloride, cetylpyridinium chloride, benzalkonium chloride, benzethonium chloride, 5-bromo-5-nitro-1,3-dioxane (bronidox), 3-[(3-Cholamidopropyl) dimethylammonio]-1-propane sulfonate, zwitterionic detergents, cocamidopropyl hydroxysultaine, cocamidopropyl betaine, imino acids, amino acids, lecithin, cetyl alcohol, stearyl alcohol, cetostearyl alcohol, oleyl alcohol, octaethylene glycol monododecyl ether, pentaethylene glycol monododecyl ether, decyl glucoside, lauryl glucoside, octyl glucoside, Triton X-100, Nonoxynol-9, Daxad 19, glyceryl laurate, dodecyldimethylamine oxide, cocamide MEA, cocamide DEA, spans, combinations thereof, and/or the like. Dispersants can help inhibit or prevent agglomeration of the CuNW 2. Surfactants can act as dispersants, dispersants can act as surfactants, and certain solvents, for example in combination with other solvents, may act as dispersants and/or surfactants. Accordingly, any of the compositions discussed herein may be considered a solvent, a dispersant, or a surfactant depending on context. In some embodiments, the dispersion 4 including CuNW 2 and dispersants and/or surfactants 6 can be 10 microliters (μL) of a 10% aqueous dispersion of bile salts added to 50 mL of 0.2 g/L CuNW dispersion 4. The dispersion 4 including CuNW 2 and dispersants and/or surfactants 6 can be contained in a beaker 8 or any other suitable container.

The surface of the CuNW 2 can be oxidized and can have adsorbed dispersants and/or surfactants 6. At least some of the CuNW 2 in the dispersion 4 can be surface-oxidized CuNW 10. An example transverse cross-section of a surface-oxidized CuNW 10 is schematically illustrated in exploded view 12. An oxidized CuNW 10 can include a copper core 14 surrounded by a metal oxide coating 16 including cuprous oxide ($Cu_2O$) and/or cupric oxide (CuO), and/or dispersants and/or surfactants 6. Oxides can block reactive sites on Cu to be replaced by Ag, as will be disclosed further herein. In certain embodiments, the metal oxide coating 16 and dispersants and/or surfactants 6 are removed, for example as described herein. CuO can be reduced to $Cu_2O$ by ethylene glycol and/or the like. $Cu_2O$ is thermodynamically unstable outside the pH range 6-14 in aqueous environments, so $Cu_2O$ can be decomposed using a solution with a pH below 6.

Filtering, Washing, and/or Deoxidizing

Figure 2:
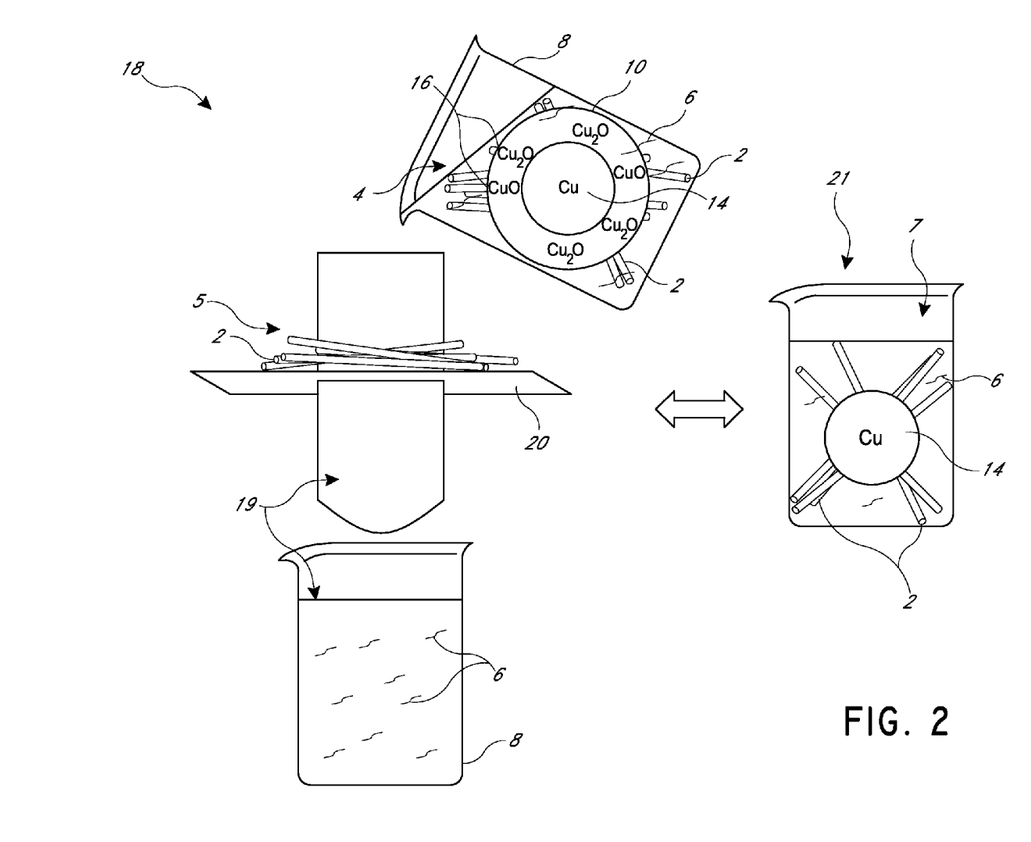
FIG. 2 illustrates an example embodiment of a process for washing, filtering, and deoxidizing copper nanowires dispersed in a dispersion.

FIG. 2 illustrates an example embodiment of a process 18 for washing, filtering, and deoxidizing copper nanowires 2 dispersed in a dispersion 4. Some of the CuNW 2 may be only partially oxidized and the dispersion 4 may include CuNW that are not oxidized. An example cross-section of a surface-oxidized CuNW that may be present in the dispersion 4 is illustrated in exploded view of an oxidized CuNW 10. The process 18 can include removing dispersants and/or surfactants 6, other impurities, metal oxide coatings 16, and/or CuNW smaller than a certain size. In some embodiments, the CuNW 2 in the dispersion 4 can be further dispersed by adding solvents (including water, alcohol such as, for example, ethanol, combinations thereof, and/or the like), dispersants, and/or surfactants before being filtered or passed through a filter 20. In certain embodiments, 50 mL of a 0.2 g/L CuNW dispersion 4 is filtered or passed through a filter 20 to remove from the dispersion 4 dispersants and/or surfactants 6 (e.g., PVP), other impurities, and/or metal oxide coatings 16. In certain embodiments, the filter 20 does not have fibers or is non-fibrous because the CuNW 2 can become irrevocably caught on filter fibers. The filter 20 can have pore sizes less than about 0.2 μm, or less than about 100 μm, less than about 70 μm, less than about 50 μm, less than about 25 μm, less than about 10 μm, less than about 1 μm, less than about 0.75 μm, less than about 0.5 μm, less than about 0.45 μm, less than about 0.4 μm, less than about 0.35 μm, less than about 0.3 μm, less than about 0.25 μm, less than about 0.2 μm, less than about 0.15 μm, less than about 0.1 μm, less than about 0.05 μm, less than about 0.025 μm, and less than about 0.01 μm, including ranges bordered and including the foregoing values. In some embodiments, the pore size of the filter 20 is selected based on at least one of the desired size of the CuNW 2 to be filtered out of the dispersion 4, the size of the material to be separated from the filtrand 5 (e.g., impurities, dispersants such as PVP, CuNW less than a certain size, combinations thereof, and/or the like). The filter can be about 47 mm wide, or other sizes depending on volume, pressure, temperature, filtration rate, etc. The filter 20 can be nitrocellulose mixed esters, nylon, polycarbonate, polypropylene, polyethersulfone, polyvinylidene difluoride, Teflon (polyfluoroethylene), combinations thereof, and/or the like.

After the CuNW dispersion 4 passes through the filter 20, the filtrate 19 can include nanowires, solvents, dispersants (e.g. PVP), impurities, surfactants, and/or other materials smaller than the pore size of the filter 20 dispersed in dispersion 4. CuNW 2 and other material larger than the pore size of the filter 20 do not pass through the filter 20. The CuNW 2 can be filtered out and remain on top of the filter 20. The filtrand 5 can be rinsed with a solvent to further help remove any remaining impurities that may have not passed through the filter 20. After the CuNW dispersion 4 passes through the filter 20, the CuNW 2 in the filtrand 5 can be scraped, dumped, and/or shaken off the filter 20 with or without a solvent. The CuNW 2 can be re-dispersed by adding solvents (including water, alcohol such as, for example, ethanol, combinations thereof, and/or the like), dispersants, and/or surfactants. In some embodiments, the CuNW dispersion can be filtered and re-dispersed as described herein one, two, three, four, five, or more times. The CuNW dispersion can be filtered through the same or a different filter 20. The number of passes through a filter 20 can affect properties of the dispersion such as purity, concentration, and average CuNW size of the CuNW 2. Filtering the dispersion more than one time can increase the purity of the CuNW 2.

Before, after, and/or between washing and filtering the CuNW dispersion 4, the CuNW 2 can optionally be deoxidized in a process 21 to remove oxidized metals on any oxidized CuNW 10. In certain embodiments, if the metal oxide coating 16 includes CuO, the CuO can be reduced to $Cu_2O$ by reaction with ethylene glycol and/or the like, for example to increase removability using acid. A low concentration acid can deoxidize oxidized CuNW 10 to remove the oxide coating 16 and attain CuNW 2 substantially having just Cu cores 14 after removal of the oxide coating 16, illustrated as a cross-section showing an exploded view of a Cu core 14 in the CuNW dispersion 7. The acid can be, for example, 0.05 M of hydrochloric acid (HCl) mixed with an alcohol such as ethanol, isopropanol, terpineol, and/or the like. Other acids can include, but not limited to sulfuric acid ($H_2SO_4$), Tartaric acid, citric acid, and/or the like. The acid should be dilute enough that a further reduction reaction is avoided. An example cross-section of a CuNW 14 substantially without oxidation that may be present in the dispersion 4 is illustrated in the process 21 after deoxidation. In some embodiments, ethanol can help inhibit or prevent agglomeration and/or oxidation of the CuNW 2. In some embodiments, a 50 mL mixture of the CuNW dispersion and the dilute acid are passed through the same or different filter 20. The filter 20 can be any suitable filter that is stable for use with acids in low concentrations.

The CuNW 2 can then be dispersed as described herein to attain a CuNW dispersion 7 with a concentration between about 0.1 g/L and about 1 g/L, including between about 0.05 g/L and about 2 g/L, about 0.05 g/L and about 1.5 g/L, about 0.05 g/L and about 1 g/L, about 0.05 g/L and about 0.5 g/L, about 0.05 g/L and about 0.1 g/L, about 0.1 g/L and about 2 g/L, about 0.1 g/L and about 1.5 g/L, about 0.1 g/L and about 1 g/L, about 0.1 g/L and about 0.5 g/L, about 0.5 g/L and about 2 g/L, about 0.5 g/L and about 1.5 g/L, about 0.5 g/L and about 1 g/L, about 1 g/L and about 2 g/L, about 1 g/L and about 1.5 g/L, and about 1.5 g/L and about 2 g/L, including ranges bordering and including the foregoing values. Solvents for adjusting concentration of the CuNW 2 in the CuNW dispersion 7 can include water and/or organic solvents such as ethanol, isopropanol, terpineol, ethylene glycol, diethylene glycol, combinations thereof, others discussed herein, and/or the like. Dispersants may also be added to the CuNW dispersion 7. The dispersants can include polymer dispersants, for example, PVP, bile salts, sodium docecyl sulphate, and/or others discussed herein. In some embodiments, the CuNW dispersion 7 can include 10 µL of a 10% aqueous solution of bile salts added to 50 mL of 0.2 g/L of CuNW dispersion. The washed, filtered, deoxidized dispersion 7 with a controlled concentration of dispersed CuNW 2 can be contained in a beaker 8 or any other suitable container.

In certain embodiments, the following steps may be performed to filter, wash, and deoxidize a CuNW dispersion. First, 50 mL of a 0.2 g/L CuNW dispersion is filtered through a filter. Second, the CuNW in the filtrand 5 are dispersed in ethanol to a volume of 50 mL and filtered again through the same or a different filter. Third, the second step is repeated 3 additional times for a total of 4 filtrations, which can each be through the same or a different filter. Fourth, the CuNW are deoxidized by mixing with an acid and dispersed in ethanol to a volume of 50 mL. Concentration can vary depending on volume of acid and ethanol used. Fifth, the 50 mL deoxidized CuNW and acid mixture is filtered through the same or a different filter. After each filtration, a subset of filtrations, or an entire series of filtrations, the filter may be discarded, or filters may be reused with other dispersions.

Fabrication of Second Nanostructures

Figure 3:
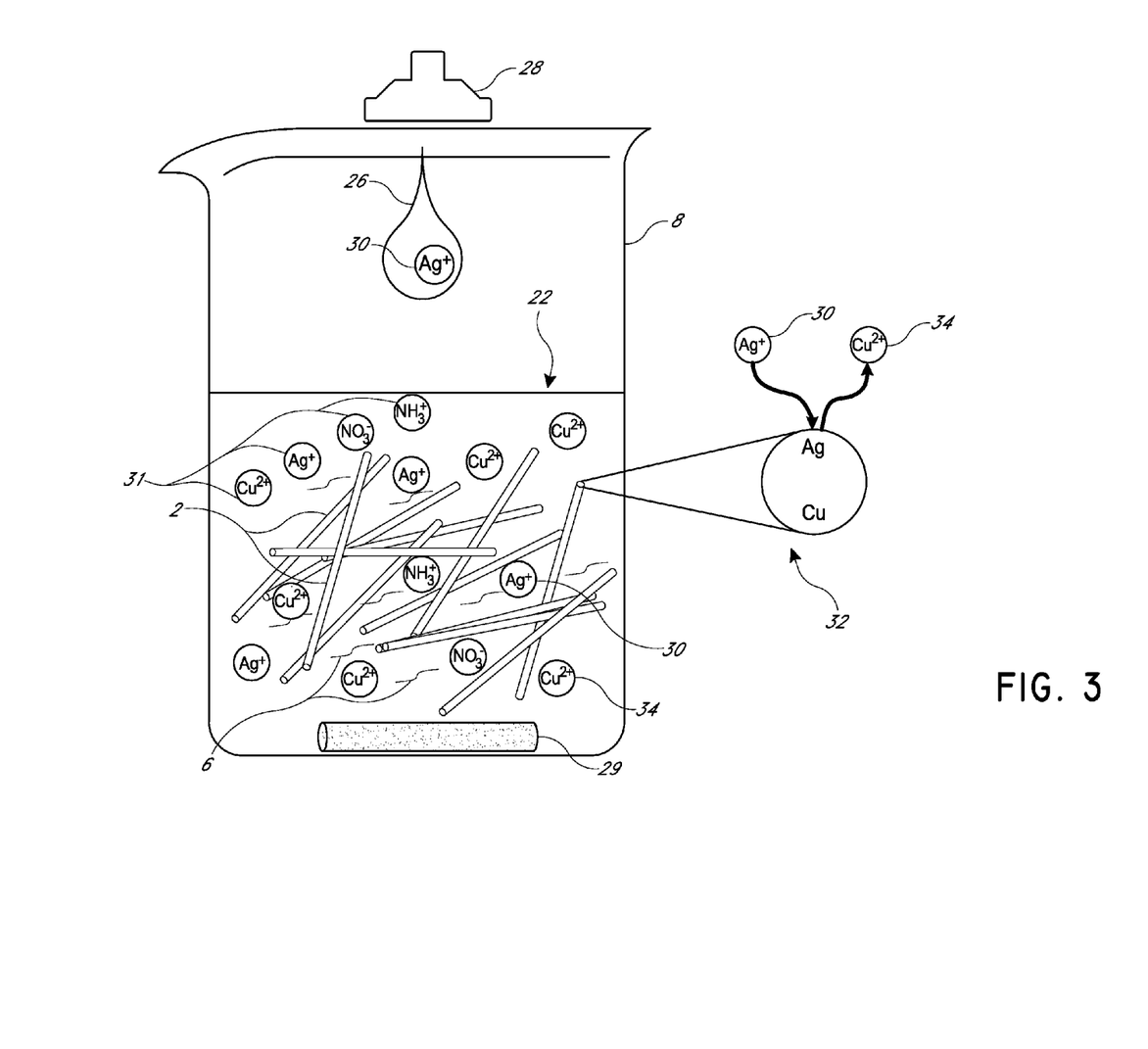
FIG. 3 illustrates an example embodiment of a process for mixing a dispersion including nanostructures comprising and a first element and a reagent solution including a second element in which the second element at least partially replaces the first element in the nanostructures.

FIG. 3 illustrates an example embodiment of a process for mixing a dispersion including nanostructures comprising and a first element and a reagent solution including a second element in which the second element at least partially replaces the first element in the nanostructures. More particularly, FIG. 3 illustrates an example embodiment of a process for mixing a dispersion 22 including CuNW 2 and a silver reagent solution 26 to form AgNW. It will be appreciated that a wide variety of alternatives are commensurate with the methods described herein. For example, the second element or silver need no be in a reagent solution, could be added in solid form, could be an element other than silver, etc. In some embodiments, the solution 26 including water, ionic liquids, and/or organic solvents and silver 30 (e.g., silver nitrate (e.g., $AgNO_3$ and/or $Ag(NH_3)_2NO_3$), ionic silver, etc.) is slowly added to the CuNW dispersion 22 with vigorous stirring. The silver 30 may be at a concentration between about 0.05 M and about 0.5 M, about 0.05 M and 0.25 M, about 0.05 M and 0.2 M, about 0.05 M and 0.15 M, about 0.1 M and 0.25 M, and about 0.1 M and 0.15 M, including ranges bordering and including the foregoing values. In some embodiments, the solution 26 is 2.1 mL of 0.113 M aqueous $AgNO_3$ for a 50 mL dispersion of 0.2 g/L CuNW. It will be appreciated that the concentration of silver 30 in the solution 26 may vary based on the form of the silver 30, the process of addition to the dispersion 22, the concentration of the CuNW 2 in the dispersion 22, combinations thereof, and/or the like. The solution 26 can be added using a shower device 28. The shower device 28 can deliver the solution 26 as single drops, shower, mist, combinations thereof, and/or the like. The solution 26 can be added to the CuNW dispersion 22 in low concentration under continuous vigorous stirring provided by a stirrer 29. In some embodiments, the stirrer 29 can be magnetic, Vortex, ultrasonic, combinations thereof, and/or any other stirring method sufficient to rapidly and/or uniformly distribute the solution 26 in the dispersion 22. A slow, even addition of the solution 26 can increase uniformity of Cu replacement by Ag and/or can help inhibit or prevent localized replacement of Cu by Ag as described herein. Inhibiting or preventing localized replacement can reduce wasted Ag, and thereby reduce costs, for example by reducing or minimizing use of Ag that does not replace Cu in the desired nanowire or nanostructure.

In certain embodiments, as the solution 26 mixes with the CuNW dispersion 22, the silver 30 reagents in the solution 26 disperse around the CuNW 2. The Ag 30 replaces the Cu 34 in the CuNW 2 to form AgNW. The dispersion 22 can include ions 31 such as, for example, $Cu^{2+}$, $Ag^+$, $NO_3^-$, $NH_3^+$, and/or the like. In some embodiments, the following reduction reaction may occur. Because Cu 34 has a higher reactivity than Ag 30, the Cu 34 displaces Ag 30 from its nitrate group in a reduction reaction or redox replacement reaction. Through the replacement or displacement reaction, the Ag 30 in a silver nitrate reagent 26 can take the place of the Cu 34 in the CuNW 2 to form AgNW. In some embodiments, the copper may react with nitrates in the solution to form copper nitrates. It will be appreciated that copper may have more affinity than silver to chemicals other than nitrates (e.g., amines), and that reactions other than redox replacement are also possible to replace the Cu in the CuNW with Ag to form AgNW. An example portion (e.g., transverse cross-section) of a CuNW 2 is shown in exploded view 32, which schematically illustrates the Ag 30 taking the place of Cu 34 in the CuNW 2 to form AgNW, while Cu 34 enters the solution. As the Cu 34 enters the solution, the Cu 34 can form Cu 34 nitrate groups such as $Cu(NO_3)_2$.

Thus, the CuNW can act as a template for silver nanowires as the Ag takes the place of Cu. Using CuNW as a template can, for example, help control the size and shape of the AgNW. In some embodiments, the Ag takes place of all of the Cu atoms in the CuNW to form a AgNW that is devoid or substantially devoid of Cu. In some embodiments, the Ag takes place of some of the Cu depending on the desired nanowire composition or structure. For example, to reduce costs but still achieve some benefits provided by Ag over Cu, only a percentage of the Cu may be replaced by Ag. The percentage may be greater than about 95%, 90%, 75%, 50%, 25%, 10%, or 5%. In some embodiments, the resulting nanowires in films have resistivity less than about $7.5 \times 10^3$ Ωm in a 2.0 vol % NW/LDPE. In some embodiments, the resulting nanowires in dispersion have transmittance greater than about 70% at a resistance of 15 Ω/sq. In certain embodiments, instead of the silver solution being slowly added to the CuNW dispersion, the CuNW dispersion is slowly added to the silver solution with vigorous stirring by a stirrer to result in the same fabrication process of AgNW as described herein.

Figure 4:
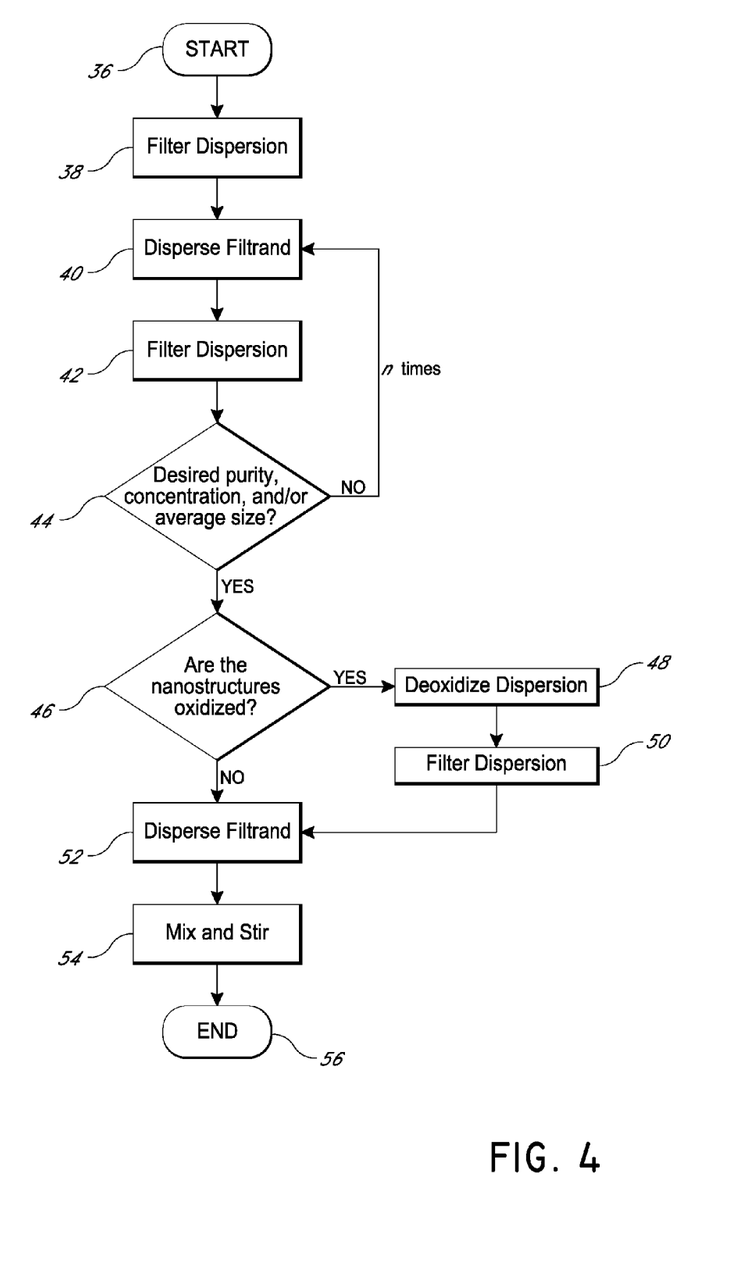
FIG. 4 depicts a simplified example of a process flow diagram illustrating steps including dispersing, filtering, deoxidizing, and/or mixing.

FIG. 4 depicts a simplified example of a process flow diagram illustrating steps including dispersing, filtering, deoxidizing, and/or mixing. The process can be used to fabricate AgNW, for example as described herein. In some embodiments, at Start 36, an initial CuNW dispersion received from the manufacturer is filtered 38 through a filter, for example as described herein. The CuNW filtrand is dispersed 40, for example as described herein. The CuNW is next filtered 42 through the same or a different filter as used in filtering step 38, for example as described herein. At decision point 44, it is determined whether the CuNW filtrand dispersion has the desired purity, concentration, and/or average size of the CuNW. If not, the dispersing step 40 and filtering step 42 are repeated n times, for example as described herein, until the desired purity, concentration, and/or average size of the CuNW is attained. After attaining the desired purity, concentration, and/or average size of the CuNW dispersion, or after reaching a maximum number n of iterations, it is determined at decision point 46 whether CuNW dispersion includes oxidized CuNW. If the CuNW dispersion may have oxidized CuNW, the CuNW are deoxidized 48, for example as described herein. Then the deoxidized CuNW dispersion is filtered 50 through the same or a different filter as used in filtering steps 38, 42, and 50, for example as described herein. The deoxidizing step 48 and filtering step 50 are optional, for example if the CuNW are not oxidized or if oxidation of the CuNW does not substantially impede the replacement reaction. After deoxidizing 48 and filtering 50, or if no deoxidizing 48 or filtering 50 is performed, the CuNW are dispersed 52, for example as described herein. The CuNW dispersion is then mixed 54 with a Ag solution and the mixture is vigorously stirred 54 until AgNW are formed, for example as described herein, ending at End 56. The steps illustrated in FIG. 4 may be rearranged, repeated, combined, and/or omitted. For example, deoxidizing 48 and filtering 50 may be performed before filtering 38. For another example, dispersing 40 may be omitted. For another example, dispersing 40, and filtering 42 may be omitted. For another example, dispersing 40, and filtering 42 may be repeated zero times. For another example, decision points 44 and 46 may be omitted, and the steps performed without regard to decision point answers (e.g., always repeat dispersing 40 and filtering 42 three times, always deoxidize 48 and filter 50, never deoxidize 48 and filter 50, etc.). Many other modifications are also possible.

In certain embodiments, the resulting AgNW dispersion can be aqueous. In other embodiments, the AgNW dispersion can comprise organic solvents. For example, the AgNW dispersion can include water, ethanol, isopropanol, terpineol, ethylene glycol, dithylene glycol, combinations thereof, and/or the like. Non-polar solvents may also be possible. In some embodiments, the AgNW dispersion comprises dispersants. Dispersants can include polymers such as, for example, polyvinylpyrrolidone, polyethylene oxide, polyoxyethylene nonylphenyl ether, polypropylene oxide, polyoxyethylene glycol alkyl ethers, polyoxypropylene glycol alkyl ethers, polyethoxylated tallow amine, poloxamers, polysorbate, polymethylmetacrylic ammonium salt, polyacrylic ammonium salt, polyacrylic amine salt, polyacrylic sodium salt, gum Arabic, combinations thereof, and/or the like. In some embodiments, the AgNW dispersion can comprise surfactants. Surfactants can include, for example, sodium lauryl ether sulfate, sodium myreth sulfate, ammonium lauryl sulfate, sodium dodecyl sulfate, alkyl aryl ether phosphate, alkyl ether phosphate, perfluorooctanesulfonate, perfluorobutanesulfonate, dioctyl sodium sulfosuccinate, alkyl benzene sulfonates, sodium stearate, sodium lauryl sarcosinate, perfluorononanoate, perfluorooctanoate, dimethyldioctadecylammonium chloride, dioctadecyldimethylammonium bromide, octenidine dihydrochloride, cetyl trimethylammonium bromide, cetyl trimethylammonium chloride, cetylpyridinium chloride, benzalkonium chloride, benzethonium chloride, 5-bromo-5-nitro-1,3-dioxane, 3-[(3-Cholamidopropyl)dimethylammonio]-1-propanesulfonate, zwitterionic detergents, cocamidopropyl hydroxysultaine, cocamidopropyl betaine, imino acids, amino acids, lecithin, cetyl alcohol, stearyl alcohol, cetostearyl alcohol, oleyl alcohol, octaethylene glycol monododecyl ether, pentaethylene glycol monododecyl ether, decyl glucoside, lauryl glucoside, octyl glucoside, Triton X-100, Nonoxynol-9, Daxad 19, glyceryl laurate, dodecyldimethylamine oxide, cocamide MEA, cocamide DEA, spans, combinations thereof, and/or the like. Dispersants can help inhibit or prevent agglomeration of a AgNW dispersion. Surfactants can act as dispersants, dispersants can act as surfactants, and certain solvents, for example in combination with other solvents, may act as dispersants and/or surfactants in a AgNW dispersion. Accordingly, any of the compositions discussed herein may be considered a solvent, a dispersant, or a surfactant depending on context.

Figure 5:
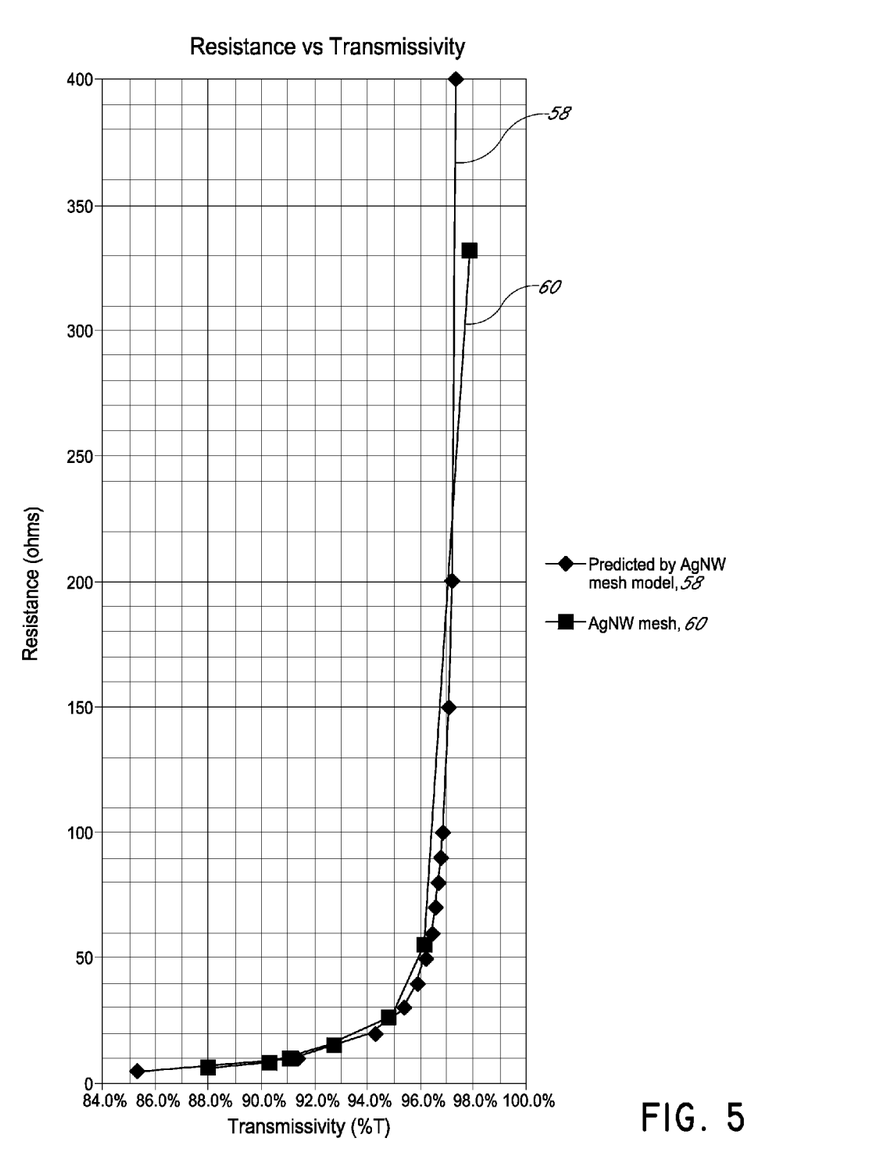
FIG. 5 depicts an example plot of resistance versus transmissivity for an example embodiment of a silver nanowire mesh.

FIG. 5 depicts an example plot of resistance versus transmissivity for an example embodiment of a AgNW mesh and/or ink. In some embodiments, the AgNW mesh and/or ink can include nanowires having a diameter between about 75 nm and about 105 nm and a length between about 30 µm and about 40 µm. Plot line 60 shows test data for resistance versus transmissivity obtained with the example embodiment AgNW mesh and/or ink. The predicted plot line 58 can be a line fit to the plot line 60 using a mathematical model that can characterize performance of a AgNW mesh and/or ink. The predicted plot line 58 can be used to predict the transmissivity of a AgNW mesh and/or ink at a given resistance. The predicted plot line 58 can be used to predict the resistance of a AgNW mesh and/or ink at a given transmissivity. As illustrated in FIG. 5, the AgNW mesh and/or ink can have a transmissivity between about 92% and about 93% at 15 $\Omega$/sq. When the AgNW mesh and/or ink is applied to a substrate, the transmissivity of the substrate can decrease the overall transmissivity of the AgNW coated substrate. For example, a polyethylene terephthalate (PET) substrate can have a transmissivity between about 88% and about 90%. When the AgNW mesh and/or ink of FIG. 5 is applied onto the PET substrate, the overall transmissivity of the AgNW coated PET substrate can be between about 80% (88%×92%) and about 84% (90%×93%) at 15 $\Omega$/sq.

Transmittance of a mesh or film on a substrate may be reported at the total transmittance of the mesh or film and substrate. In such cases, the transmittance of the mesh or film can be determined by dividing the reported transmittance by the transmittance of the substrate. For example, if transmittance of a mesh or film including a PET substrate is reported at 83% (e.g., at a resistance of 15 $\Omega$/sq), then the transmittance of the mesh or film without the substrate would be between about 92% (83%/90%) and about 94% (83%/88%) at that resistance.

The transmittance of AgNW in a mesh or ink and the resistance of AgNW in the mesh or ink may be related, and the transmittance of AgNW in a mesh or ink and the conductivity of AgNW in the mesh or ink may be inversely related. For example, when a AgNW mesh or ink has a low resistance, the mesh or ink generally includes a larger proportion of AgNW such that the mesh or ink is able to conduct electric signals with less resistance, but that same larger proportion of AgNW may cause the mesh or ink to reflect more incident light, reducing transmittance of the mesh or ink. AgNW in a mesh or ink and having a higher resistivity than 15 $\Omega$/sq may have higher transmittance, for example greater than about 92% or greater than about 93%. AgNW in a mesh or ink and having a lower resistivity than 15 $\Omega$/sq may have lower transmittance, for example less than about 92% or less than about 93%, but that transmittance would still be higher than CuNW in the mesh or ink at the same resistivity. Factors such as AgNW dimensions, uniformity of the AgNW, etc. may also influence conductivity and/or transmittance.

In certain the embodiments, the AgNW dispersion can be used in conductive inks and polymers for applications such as, for example, electrical devices, displays or screens, solar panels, and/or the like. The AgNW formed by the above technique can be employed in other conductive ink and polymer applications as described in the '999 application, the entire disclosure of which is incorporated herein by reference and appended.

The following is a list of example embodiments:
1. A method comprising:
   mixing a dispersion and a reagent solution, the dispersion including nanostructures comprising a first element, the reagent solution including a second element, the second element at least partially replacing the first element in the nanostructures.
2. The method of Embodiment 1, wherein the nanostructures comprise nanowires.
3. The method of Embodiment 1 or 2, wherein the first element is copper.
4. The method of any of Embodiments 1-3, wherein the second element is silver.
5. The method of any of Embodiments 1-4, wherein a concentration of the nanostructures in the dispersion is between about 0.1 g/L and about 1 g/L.
6. The method of any of Embodiments 1-5, wherein the dispersion includes at least one of dispersants and surfactants.
7. The method of any of Embodiments 1-6, wherein the dispersion includes polyvinylpyrrolidone.
8. The method of any of Embodiments 1-7, wherein the dispersion includes bile salts.
9. The method of any of Embodiments 1-8, wherein the dispersion includes water.
10. The method of any of Embodiments 1-9, wherein the dispersion includes organic solvent.
11. The method of Embodiment 10, wherein the organic solvent comprises ethanol.
12. The method of any of Embodiments 1-11, wherein a concentration of the reagent solution is between about 0.1 M and about 0.15 M.
13. The method of any of Embodiments 1-12, wherein the reagent solution comprises a silver nitrate.
14. The method of any of Embodiments 1-13, wherein the reagent solution comprises silver ions.
15. The method of any of Embodiments 1-14, mixing comprises slowly adding the reagent solution.
16. The method of Embodiment 15, wherein slowly adding comprises drop-wise adding.
17. The method of any of Embodiments 1-16, wherein mixing comprises vigorously stirring with a stirrer.
18. The method of Embodiment 17, wherein the stirrer comprises a magnetic stirrer.
19. The method of any of Embodiments 1-18, wherein the second element partially replaces the first element in the nanostructures.
20. The method of Embodiment 19, wherein the second element replaces at least about 5% of the first element in the nanostructures.
21. The method of Embodiment 19, wherein the second element replaces at least about 10% of the first element in the nanostructures.
22. The method of Embodiment 19, wherein the second element replaces at least about 25% of the first element in the nanostructures.
23. The method of Embodiment 19, wherein the second element replaces at least about 50% of the first element in the nanostructures.
24. The method of Embodiment 19, wherein the second element replaces at least about 75% of the first element in the nanostructures.
25. The method of Embodiment 19, wherein the second element replaces at least about 90% of the first element in the nanostructures.
26. The method of Embodiment 19, wherein the second element replaces at least about 95% of the first element in the nanostructures.
27. The method of any of Embodiments 1-18, wherein the second element substantially fully replaces the first element in the nanostructures.
28. The method of any of Embodiments 1-27, wherein, after mixing, the nanostructures in films have a resistivity less than about $7.5 \times 10^3$ Ωm in a 2.0 vol % nanostructures/low density polyethylene.
29. The method of any of Embodiments 1-28, wherein, after mixing, the nanostructures in dispersion have a visible light transmittance greater than about 70% at a resistance of 15 Ω/sq.
30. The method of any of Embodiments 1-29, further comprising, before mixing, filtering the nanostructures.
31. The method of Embodiment 30, wherein filtering the nanostructures includes using a non-fibrous filter.
32. The method of Embodiment 31, wherein the filter includes pores having a size of about 0.2 microns or less.
33. The method of Embodiment 31 or 32, wherein the filter comprises Teflon.
34. The method of any of Embodiments 30-33, further comprising dispersing the nanostructures in a solvent.
35. The method of Embodiment 34, wherein the solvent includes water.
36. The method of Embodiments 34 or 35, wherein the solvent includes organic solvent.
37. The method of Embodiment 36, wherein the organic solvent comprises ethanol.
38. The method of any of Embodiments 34-37, wherein the solvent includes at least one of dispersants and surfactants.
39. The method of Embodiment 38, wherein the solvent includes polyvinylpyrrolidone.
40. The method of Embodiment 38 or 39, wherein the solvent includes bile salts.
41. The method of any of Embodiments 1-40, further comprising deoxidizing the nanostructures.
42. The method of Embodiment 41, wherein deoxidizing comprises mixing an acid and a first dispersion including oxidized nanostructures.
43. The method of Embodiment 42, wherein the acid comprises about 0.05 M HCl.
44. The method of Embodiment 42 or 43, further comprising filtering the mixed acid and first dispersion through a filter.
45. The method of Embodiment 44, wherein the filter is a non-fibrous filter.
46. The method of Embodiment 44 or 45, wherein the filter includes pores having a size of about 0.2 microns or less.
47. The method of any of Embodiments 44-46, wherein the filter is stable with acids in low concentrations.
48. The method of any of Embodiments 44-47, wherein the filter comprises Teflon.
49. The method of any of Embodiments 41-48, further comprising dispersing the deoxidized nanostructures in a solvent.
50. The method of Embodiment 49, wherein the solvent includes water.
51. The method of Embodiments 49 or 50, wherein the solvent includes organic solvent.
52. The method of Embodiment 51, wherein the organic solvent comprises ethanol.

53. The method of any of Embodiments 49-52, wherein the solvent includes at least one of dispersants and surfactants.

54. The method of Embodiment 53, wherein the solvent includes polyvinylpyrrolidone.

55. The method of Embodiment 53 or 54, wherein the solvent includes bile salts.

56. The method of any of Embodiments 1-55, further comprising, after mixing, adding the nanostructures to an ink.

57. The method of Embodiment 56, further comprising printing the ink to form a transparent conductive portion of a device.

58. The method of Embodiment 57, wherein the device comprises a solar device.

59. The method of Embodiment 57, wherein the device comprises a display.

60. A system for performing the method of any of Embodiments 1-59.

61. A method comprising:
filtering a dispersion including nanostructures.

62. The method of Embodiment 61, wherein the nanostructures comprise nanowires.

63. The method of Embodiment 61 or 62, wherein the nanostructures comprise copper.

64. The method of any of Embodiments 61-63, wherein, after filtering, a concentration of the nanostructures in the dispersion is between about 0.1 g/L and about 1 g/L.

65. The method of any of Embodiments 61-64, wherein the dispersion includes at least one of dispersants and surfactants.

66. The method of any of Embodiments 61-65, wherein the dispersion includes polyvinylpyrrolidone.

67. The method of any of Embodiments 61-66, wherein the dispersion includes bile salts.

68. The method of any of Embodiments 61-67, wherein the dispersion includes water.

69. The method of any of Embodiments 61-68, wherein the dispersion includes organic solvent.

70. The method of Embodiment 69, wherein the organic solvent comprises ethanol.

71. The method of any of Embodiments 61-70, wherein filtering the nanostructures includes using a non-fibrous filter.

72. The method of Embodiment 71, wherein the filter includes pores having a size of about 0.2 microns or less.

73. The method of Embodiment 71 or 72, wherein the filter comprises Teflon.

74. The method of any of Embodiments 61-73, further comprising dispersing the nanostructures in a solvent.

75. The method of Embodiment 74, wherein the solvent includes water.

76. The method of Embodiments 74 or 75, wherein the solvent includes organic solvent.

77. The method of Embodiment 76, wherein the organic solvent comprises ethanol.

78. The method of any of Embodiments 74-77, wherein the solvent includes at least one of dispersants and surfactants.

79. The method of Embodiment 78, wherein the solvent includes polyvinylpyrrolidone.

80. The method of Embodiment 78 or 79, wherein the solvent includes bile salts.

81. The method of any of Embodiments 61-80, further comprising deoxidizing the nanostructures.

82. The method of Embodiment 81, wherein deoxidizing comprises mixing an acid and a first dispersion including oxidized nanostructures.

83. The method of Embodiment 82, wherein the acid comprises about 0.05 M HCl.

84. The method of Embodiment 82 or 83, further comprising filtering the mixed acid and first dispersion through a filter.

85. The method of Embodiment 84, wherein the filter is a non-fibrous filter.

86. The method of Embodiment 84 or 85, wherein the filter includes pores having a size of about 0.2 microns or less.

87. The method of any of Embodiments 84-86, wherein the filter is stable with acids in low concentrations.

88. The method of any of Embodiments 84-87, wherein the filter comprises Teflon.

89. The method of any of Embodiments 81-88, further comprising dispersing the deoxidized nanostructures in a solvent.

90. The method of Embodiment 89, wherein the solvent includes water.

91. The method of Embodiments 89 or 90, wherein the solvent includes organic solvent.

92. The method of Embodiment 91, wherein the organic solvent comprises ethanol.

93. The method of any of Embodiments 89-92, wherein the solvent includes at least one of dispersants and surfactants.

94. The method of Embodiment 93, wherein the solvent includes polyvinylpyrrolidone.

95. The method of Embodiment 93 or 94, wherein the solvent includes bile salts.

96. A system for performing the method of any of Embodiments 61-95.

97. A dispersion comprising:
a solvent; and
nanowires comprising silver and having a length greater than about 10 microns in a dimension, the nanowires dispersed in the solvent.

98. The dispersion of Embodiment 97, wherein the length is greater than about 25 microns in the dimension.

99. The dispersion of Embodiment 97 or 98, wherein the length is greater than about 50 microns in the dimension.

100. The dispersion of any of Embodiments 97-99, wherein the length is greater than about 70 microns in the dimension.

101. The dispersion of any of Embodiments 97-100, wherein the length is less than about 150 microns in the dimension.

102. The dispersion of Embodiment 97, wherein the length is between about 10 microns and about 150 microns in the dimension.

103. The dispersion of Embodiment 97 or 102, wherein the length is between about 25 microns and about 150 microns in the dimension.

104. The dispersion of any of Embodiments 97, 102, and 103, wherein the length is between about 50 microns and about 150 microns in the dimension 105. The dispersion of any of Embodiments 97 and 102-104, wherein the length is between about 70 microns and about 150 microns in the dimension.

106. The dispersion of any of Embodiments 97-105, wherein the nanowires comprise at least about 5% silver.

107. The dispersion of any of Embodiments 97-106, wherein the nanowires comprise less than about 95% copper.

108. The dispersion of any of Embodiments 97-107, wherein the nanowires comprise at least about 10% silver.

109. The dispersion of any of Embodiments 97-108, wherein the nanowires comprise less than about 90% copper.

110. The dispersion of any of Embodiments 97-109, wherein the nanowires comprise at least about 25% silver.

111. The dispersion of any of Embodiments 97-110, wherein the nanowires comprise less than about 75% copper.

112. The dispersion of any of Embodiments 97-111, wherein the nanowires comprise at least about 50% silver.

113. The dispersion of any of Embodiments 97-112, wherein the nanowires comprise less than about 50% copper.

114. The dispersion of any of Embodiments 97-113, wherein the nanowires comprise at least about 75% silver.

115. The dispersion of any of Embodiments 97-114, wherein the nanowires comprise less than about 25% copper.

116. The dispersion of any of Embodiments 97-115, wherein the nanowires comprise at least about 90% silver.

117. The dispersion of any of Embodiments 97-116, wherein the nanowires comprise less than about 10% copper.

118. The dispersion of any of Embodiments 97-117, wherein the nanowires comprise at least about 95% silver.

119. The dispersion of any of Embodiments 97-118, wherein the nanowires comprise less than about 5% copper.

120. The dispersion of any of Embodiments 97-119, wherein the nanowires comprise about 100% silver.

121. The dispersion of any of Embodiments 97-120, wherein the nanowires comprise substantially no copper.

122. The dispersion of any of Embodiments 97-121, wherein the nanowires in films have a resistivity less than about $7.5 \times 10^3$ Ωm in a 2.0 vol % nanowires/low density polyethylene.

123. The dispersion of any of Embodiments 97-122, wherein the nanowires in dispersion have a visible light transmittance greater than about 70% at a resistance of 15 Ω/sq.

124. The dispersion of any of Embodiments 97-123, wherein a concentration of the nanowires is between about 0.1 g/L and about 1 g/L.

125. The dispersion of any of Embodiments 97-124, wherein the solvent includes water.

126. The dispersion of any of Embodiments 97-125, wherein the solvent includes organic solvent.

127. The dispersion of Embodiment 126, wherein the organic solvent comprises ethanol.

128. The dispersion of any of Embodiments 97-127, wherein the solvent includes at least one of dispersants and surfactants.

129. The dispersion of Embodiment 128, wherein the solvent includes polyvinylpyrrolidone.

130. The dispersion of Embodiment 128 or 129, wherein the solvent includes bile salts.

131. A conductive ink comprising the dispersion of any of Embodiments 97-130.

132. A device comprising the conductive ink of Embodiment 131.

133. The device of Embodiment 132, wherein the device comprises a solar device.

134. The device of Embodiment 132, wherein the device comprises a display.

The foregoing detailed description has set forth various embodiments of the systems and/or methods via the use of figures and/or examples. Insofar as such figures and/or examples contain one or more functions and/or operations, it will be understood by those within the art that each function and/or operation within figures or examples can be implemented individually and/or collectively. The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended Certain Embodiments (e.g., bodies of the appended Certain Embodiments) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the following appended Certain Embodiments may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method comprising:
   mixing a dispersion and a reagent solution, the dispersion including nanostructures comprising a first element, the reagent solution including a second element, the second element replacing at least 60% of the first element in the nanostructures,
   wherein a concentration of the nanostructures in the dispersion is between about 0.1 g/L and about 1 g/L,
   wherein a concentration of the reagent solution is between about 0.1 M and about 0.15 M, and
   wherein the reagent solution comprises at least one selected from a group consisting of silver nitrate and silver ions.

2. The method of claim 1, wherein the nanostructures comprise nanowires.

3. The method of claim 2, wherein length of the nanowires is about 50 microns to about 150 microns.

4. The method of claim 1, wherein a dimension of the nanostructures is less than 500 nm.

5. The method of claim 1, wherein the nanostructures have a length to width ratio greater than about 1,000:1.

6. The method of claim 1, further comprising deoxidizing the nanostructures.

7. The method of claim 6, wherein deoxidizing comprises mixing an acid and a first dispersion including oxidized nanostructures.

8. The method of claim 7, further comprising filtering the mixed acid and first dispersion through a filter.

9. The method of claim 7, wherein the acid comprises 0.05 M hydrochloric acid.

10. The method of claim 1, wherein the first element is copper and the second element is silver.

11. The method of claim 1, wherein the dispersion comprises at least one selected from a group consisting of water, organic solvent, ethanol, polyvinylpyrrolidone, and bile salts.

12. The method of claim 1, wherein mixing comprises adding the reagent solution at least one of drop-wise, shower-wise, or mist-wise.

13. The method of claim 1, wherein mixing comprises stirring.

14. The method of claim 1, wherein the second element replaces at least 75% of the first element.

15. The method of claim 1, wherein the dispersion includes at least one selected from a group consisting of dispersants and surfactants.

16. The method of claim 1, further comprising before mixing, filtering the dispersion including the nanostructures comprising the first element and dispersing the filtered nanostructures.

17. The method of claim 16, wherein filtering the nanostructures comprises using a non-fibrous filter.

18. The method of claim 1, further comprising dispersing the nanostructures in a solvent.

19. A method comprising:
    mixing a dispersion and a reagent solution, the dispersion including nanowires comprising copper, the reagent solution including silver, wherein the silver replaces at least 60% of the copper in the nanowires,
    wherein length of the nanowires is about 50 microns to about 150 microns.

20. The method of claim 19, wherein the dispersion comprises at least one selected from a group consisting of water, organic solvent, ethanol, polyvinylpyrrolidone, and bile salts.

21. The method of claim 19, wherein mixing comprises adding the reagent solution at least one of drop-wise, shower-wise, or mist-wise.

22. The method of claim 19, wherein a concentration of the nanowires in the dispersion is between about 0.1 g/L and about 1 g/L, and wherein a concentration of the reagent solution is between about 0.1 M and about 0.15 M.

* * * * *